US012073812B2

(12) United States Patent
Son

(10) Patent No.: US 12,073,812 B2
(45) Date of Patent: Aug. 27, 2024

(54) LIGATURE FOR A WOODWIND INSTRUMENT MOUTHPIECE

(71) Applicant: BK & SONS CORPORATION, Ridgefield, NJ (US)

(72) Inventor: Hye Seong Son, Closter, NJ (US)

(73) Assignee: BK & SONS CORPORATION, Ridgefield, NJ (US)

( * ) Notice: Subject to any disclaimer, the term of this patent is extended or adjusted under 35 U.S.C. 154(b) by 0 days.

(21) Appl. No.: 17/751,561

(22) Filed: May 23, 2022

(65) Prior Publication Data

US 2022/0383838 A1 Dec. 1, 2022

Related U.S. Application Data

(60) Provisional application No. 63/191,860, filed on May 21, 2021.

(51) Int. Cl.
*G10D 9/02* (2020.01)
*G10D 7/06* (2020.01)

(52) U.S. Cl.
CPC ................ *G10D 9/02* (2013.01); *G10D 7/06* (2013.01)

(58) Field of Classification Search
CPC .................................. G10D 9/02; G10D 7/06
See application file for complete search history.

(56) References Cited

U.S. PATENT DOCUMENTS 5,648,623 A * 7/1997 Silverstein .............. G10D 9/02 84/383 R
2009/0217798 A1* 9/2009 Rovner ................... G10D 9/02 84/383 R

* cited by examiner

*Primary Examiner* — Kimberly R Lockett
(74) *Attorney, Agent, or Firm* — Kim IP Law Group LLC

(57) ABSTRACT

A ligature for a mouthpiece of a musical instrument that includes a puller that includes a plurality of through holes, a cord for passing through the plurality of through holes, and a bridge configured to straddle the puller and engage the mouthpiece, the bridge including a plate, an arm extending from the plate, and a mouthpiece skate extending from the arm; and a fastener for securing the puller and the bridge.

9 Claims, 20 Drawing Sheets

LIGATURE FOR A WOODWIND INSTRUMENT MOUTHPIECE

CROSS-REFERENCE TO RELATED APPLICATIONS

The present application claims the benefit of U.S. Provisional Application 63/191,860, filed May 21, 2021, which is hereby incorporated by reference in its entirety.

BACKGROUND

The present disclosure relates generally to improved ligatures for woodwind instruments.

Woodwind musical instruments generally include a reed securely coupled to a mouthpiece via a ligature. There remain areas in which ligatures can be improved. As dictated by the particular make and model of the instrument, a ligature must conform to mouthpieces having different angles. For example, as shown in FIG. 1A, a ligature, such as ligature 1004, can be sized to properly fit a mouthpiece with a regular or standard slope. Nevertheless, when the same ligature is applied to a mouthpiece having a steeper slope, as shown in FIG. 1B, a gap, such as gap 1026 between the cord 1006 and the mouthpiece, may occur, resulting in a loose fit.

The security of the engagement of the ligature and mouthpiece can also be improved. As shown best in FIGS. 2A-2B, the bridge 1016 includes an upper plate 1028, which surrounds the centrally located through hole 1022. A pair of legs 1030*a*, 1030*b* extend from the upper plate 1028, straddling the puller 1008, with the ends 1032*a*, 1032*b* of each the legs engaging the mouthpiece 1000. The arms 1030*a*, 1030*b* have a constant width, w, along a longitudinal direction 1034 of the mouthpiece from where the arm extends from the upper plate 1028 to the ends 1032*a*, 1032*b*. The contact area provided by the ends of the arm 1032*a*, 1032*b* undesirably allows the ligature 1004 to slip.

Also, ligature 1004 can scratch the instrument. Each of the arms also include planar faces, such as planar faces 1036*a*, 1036*b* of arm 1030*a* that face (i.e., run perpendicular to) the longitudinal direction of the mouthpiece. These planar faces include edges 1038*a*, 1038*b* that engage the surface of the mouthpiece, are capable of scratching the mouthpiece (FIG. 3B). Arm 1030*b* similarly yields sharp edges, such as edges 1038*c*, 1038*d*.

BRIEF SUMMARY OF THE INVENTION

To address these shortcomings, the present disclosure provides a ligature with an improved bridge.

One exemplary embodiment of the subject disclosure provides a ligature for a mouthpiece of a musical instrument that includes a puller that includes a plurality of through holes, a cord for passing through the plurality of through holes, and a bridge configured to straddle the puller and engage the mouthpiece, the bridge including a plate, an arm extending from the plate, and a mouthpiece skate extending from the arm. The ligature further includes a fastener for securing the puller and the bridge.

In another exemplary embodiment, the mouthpiece skate is curved and/or has a larger width than a width of the arm. In yet another exemplary embodiment, the mouthpiece skate includes a central segment and an outer segment extending at angle with respect to the center segment. In another exemplary embodiment, the mouthpiece skate includes a substantially circular longitudinal cross-section.

Another exemplary embodiment of the subject disclosure provides a bridge for a ligature that includes an upper plate including a through hole, a pair of arms extending from opposite ends of the upper plate; and mouthpiece skates extending from each of the arms, the mouthpiece skates respectively having at least one end extending at an angle relative to a horizontal plane defined by a lowermost surface of the mouthpiece skates.

BRIEF DESCRIPTION OF THE SEVERAL VIEWS OF THE DRAWING

The foregoing summary, as well as the following detailed description of the exemplary embodiments of the invention, will be better understood when read in conjunction with the appended drawings. For the purpose of illustrating the subject disclosure, there are shown in the drawings exemplary embodiments. It should be understood, however, that the exemplary embodiments are not limited to the precise arrangements and instrumentalities shown.

DETAILED DESCRIPTION OF THE INVENTION

Figure 1A:
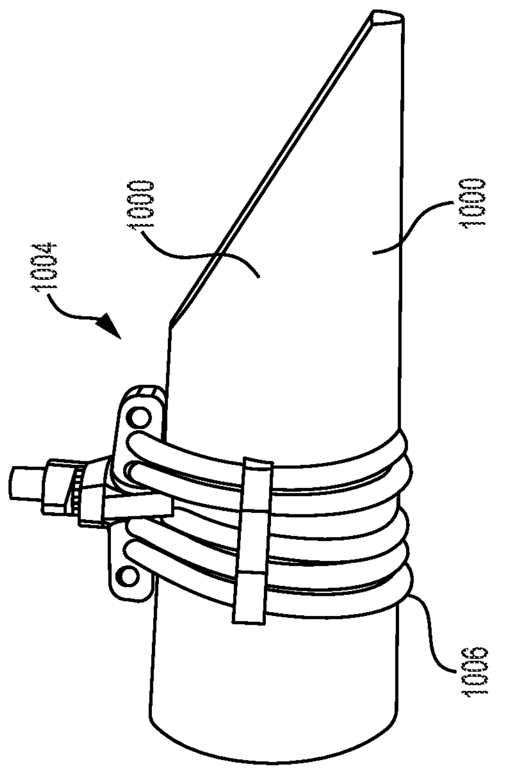
FIG. 1A PRIOR ART
FIGS. 1A and 1B are side views of a ligature of the prior art being applied to mouthpieces of varying slopes.
Figure 1B:
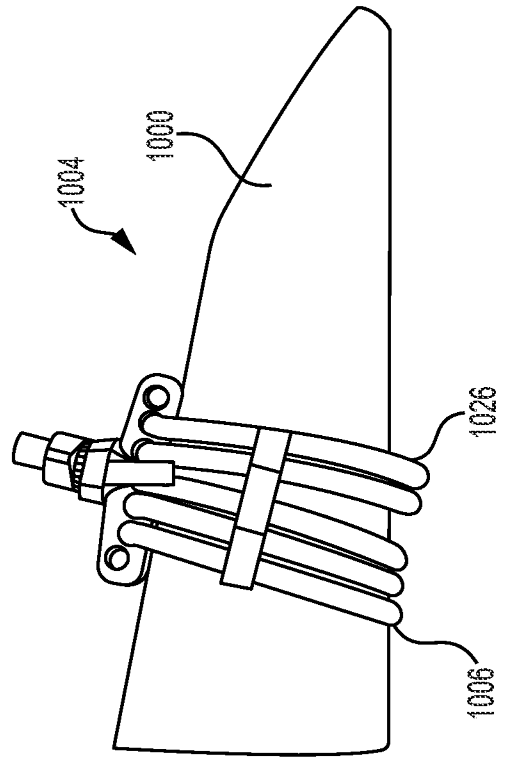
FIG. 1B PRIOR ART
Figure 2B:
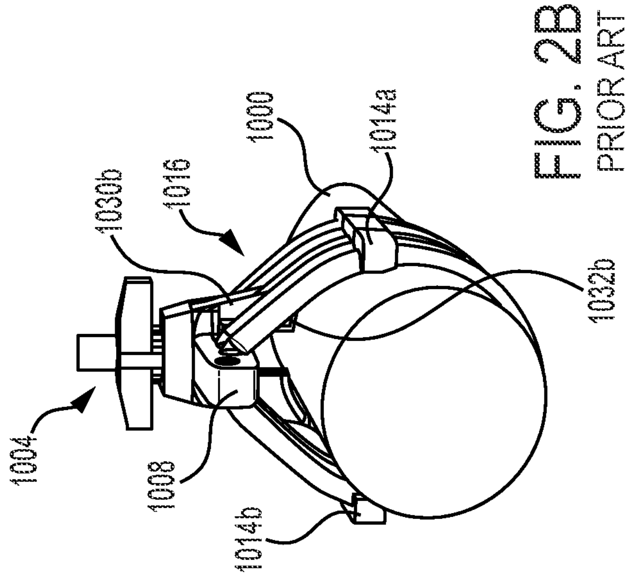
FIG. 2B PRIOR ART
FIGS. 2A and 2B are perspective views of the ligature of FIG. 1.
Figure 2A:
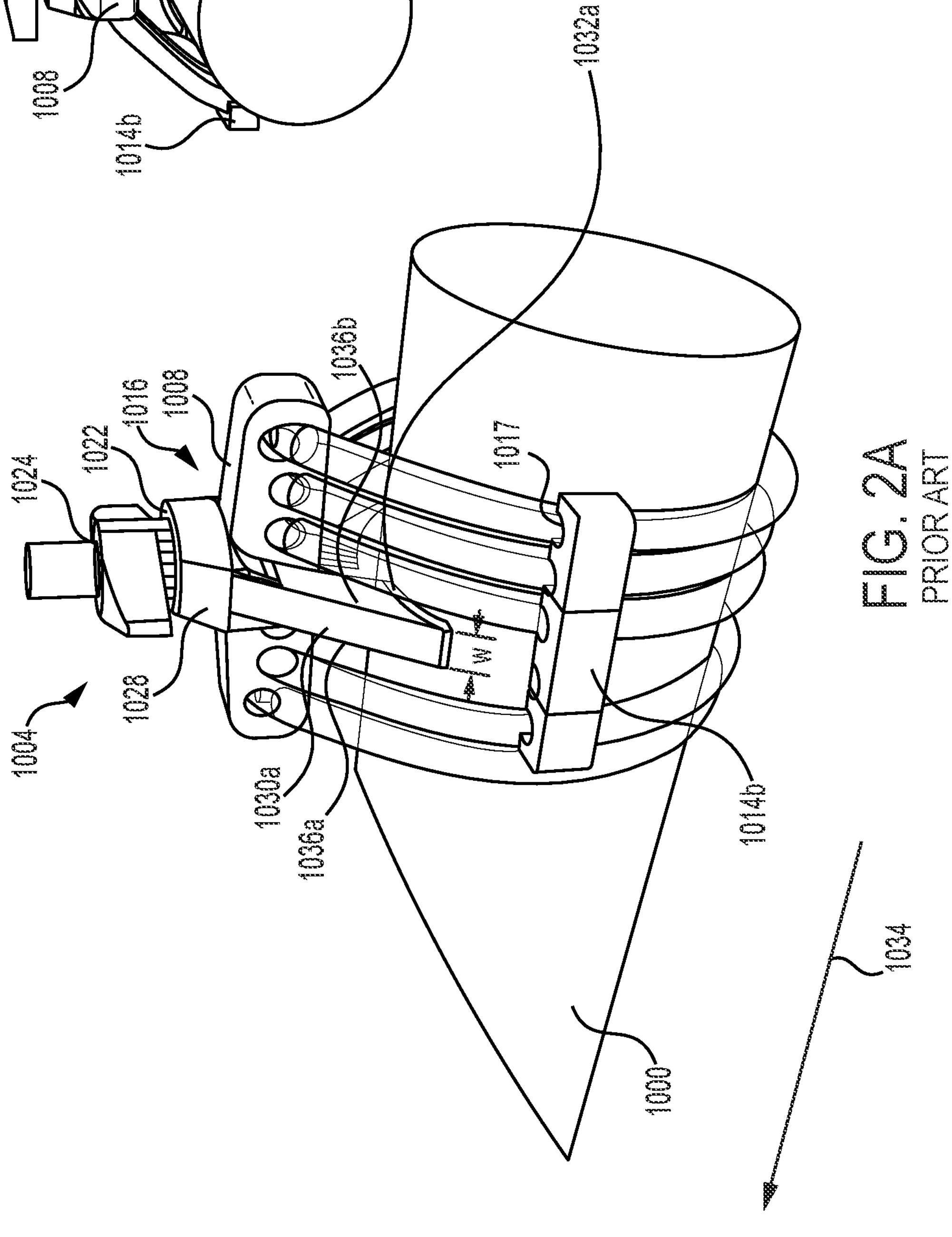
FIG. 2A PRIOR ART

Reference will now be made in detail to the exemplary embodiments of the invention illustrated in the accompanying drawings. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "right," "left," "top," "bottom," "front" "rear" "anterior," and "posterior" are used throughout the specification for convenience and it should be understood that these terms are not intended to be limiting. The terms "right," "left," "top," "bottom," "front" and "rear" designate directions in the drawings to which reference is made. The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

"Substantially" as used herein shall mean considerable in extent, largely but not wholly that which is specified, or an appropriate variation therefrom as is acceptable within the field of art. "Exemplary" as used herein shall mean serving as an example.

Furthermore, the described features, advantages and characteristics of the embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all embodiments of the subject disclosure.

Figure 3A:
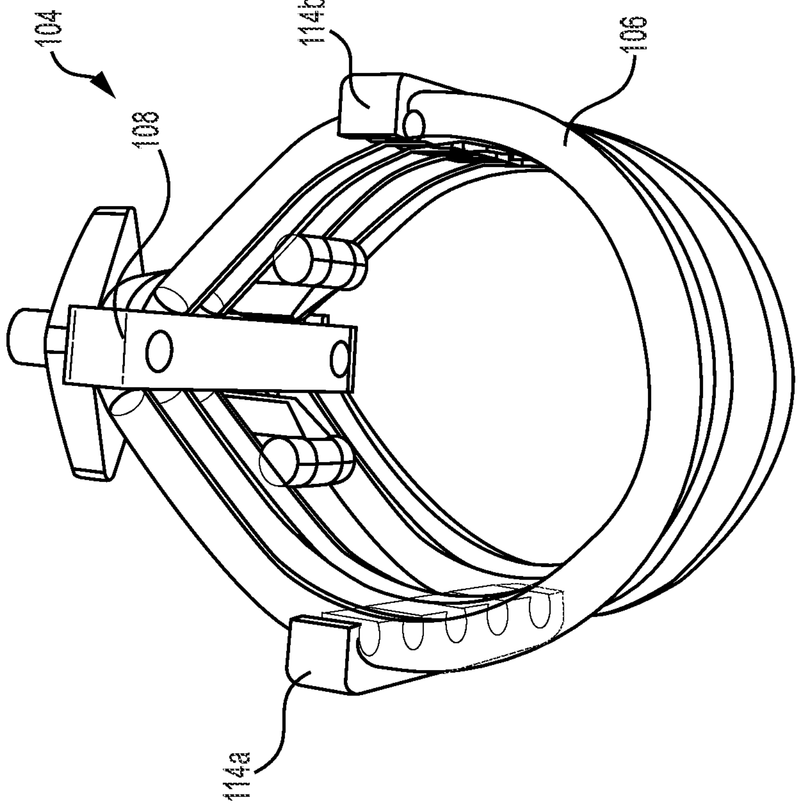
FIGS. 3A and 3B are perspective views of a ligature in accordance with an exemplary embodiment of the subject disclosure and the ligature of FIG. 1, respectively.
Figure 3B:
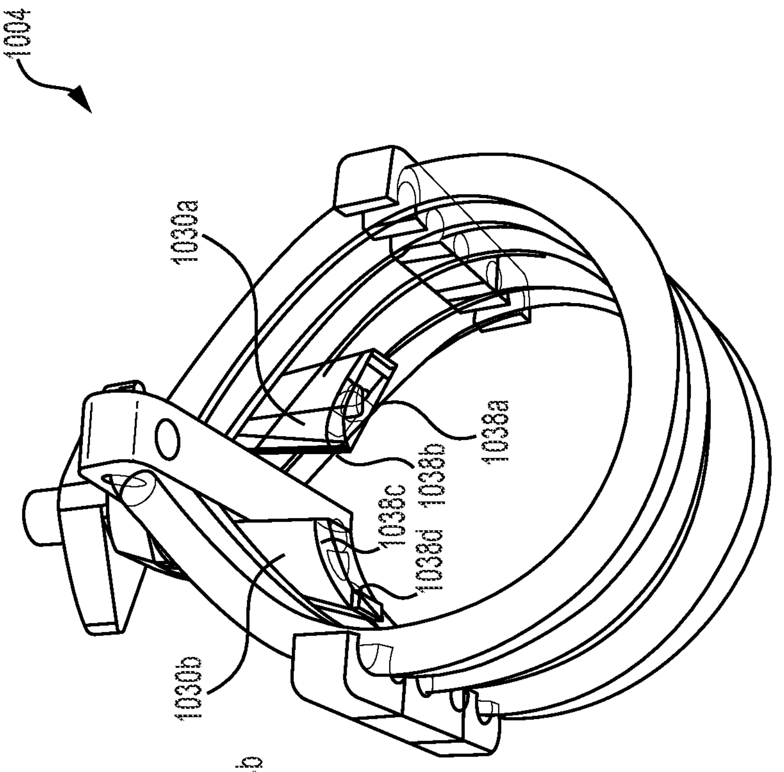
FIG. 3B PRIOR ART
Figure 4B:
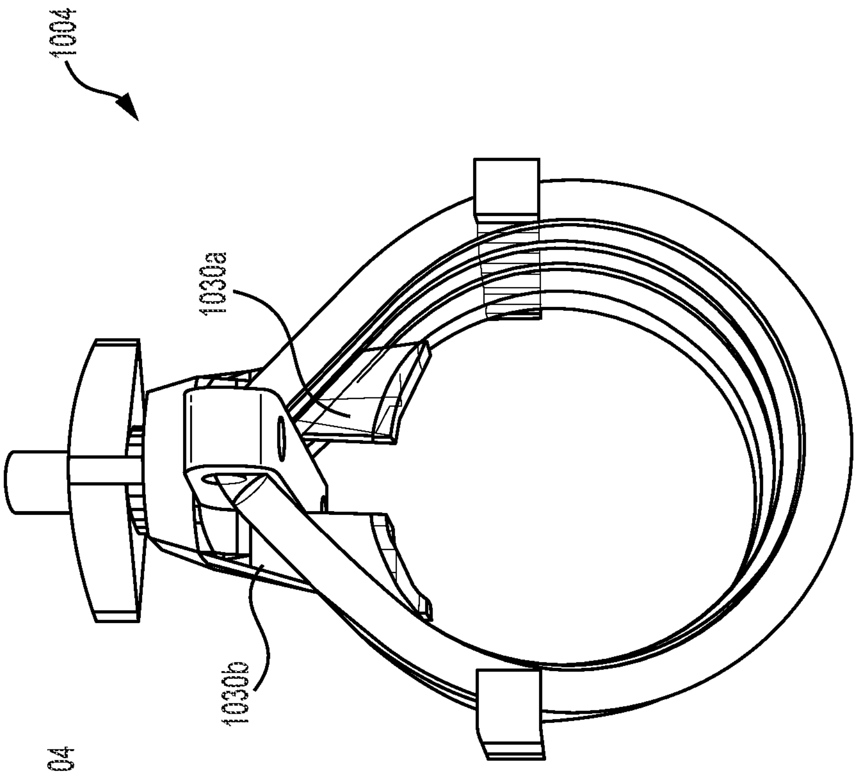
FIG. 4B PRIOR ART
FIGS. 4A and 4B are perspective views of the ligature of FIG. 3A and the ligature of FIG. 1, respectively.
Figure 4A:
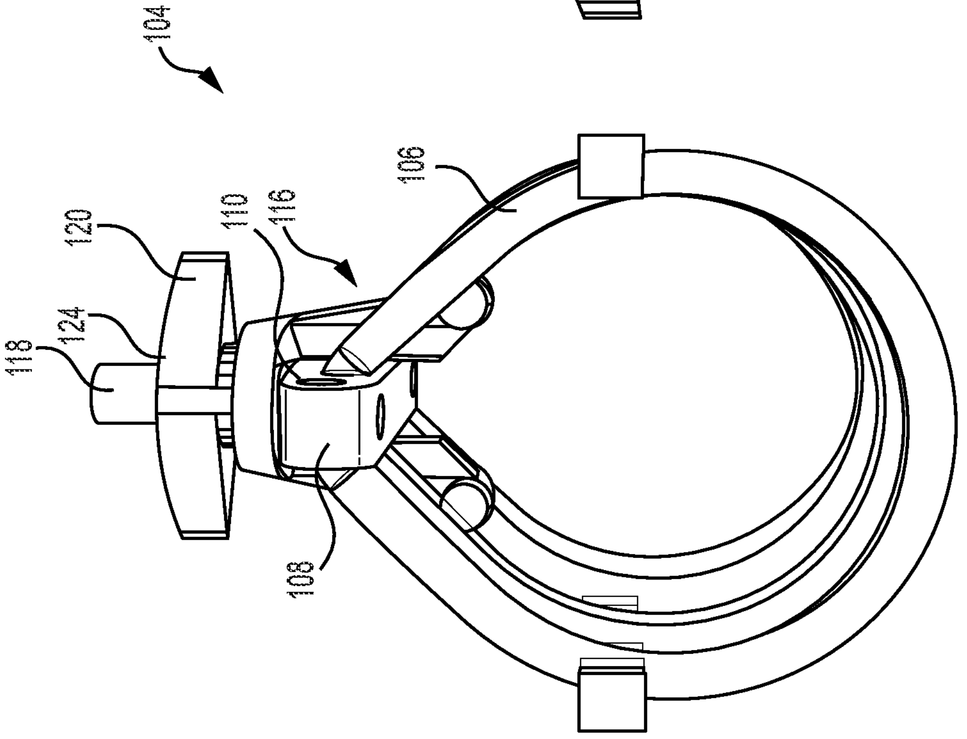
Figure 5A:
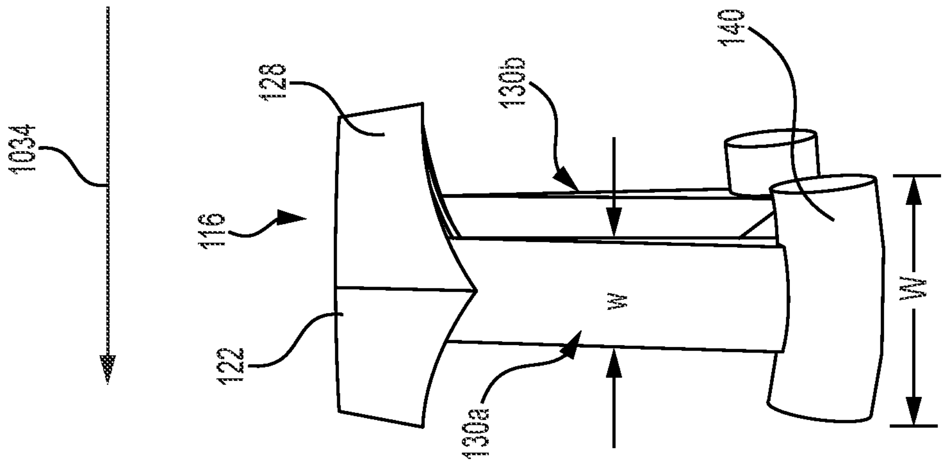
FIGS. 5A, 5B, 5C, 5D, 5E, and 5F are various views of exemplary bridges of the ligature of the subject disclosure.

Referring now to the drawings, FIGS. 3A, 4A and 5A illustrate exemplary embodiments of a ligature of the subject disclosure, and particular components thereof. Ligature 104 includes a cord 106 that can be composed of, for example, a synthetic fiber such as Kevlar®; and a puller 108 extending in a longitudinal direction of the reed.

The puller 108 includes a plurality of through holes 110 extending through planar sides of the puller, the through holes are sized to receive the cord 106. A guide bar 118 extends proud of the puller, containing a threaded outer surface, sized and threaded to receive a fastener having complementary threads, which in this exemplary embodiment is in the form of a wingnut 120, though other fasteners such as a hex nut or the like could alternatively be employed. A bridge 116, which will be discussed in greater detail below, including a through hole 122 sized to be received by the guide bar 118 is also provided. The wingnut 120 includes a centrally located orifice 124 that is provided with threads complementary to the guide bar 118. The wingnut 120 engages the bridge 116 to secure the puller 108 to the mouthpiece.

The cord 106 winds around the reed in a spiral fashion, being introduced sequentially to another of the plurality of through holes 110 at each turn. The puller is preferably disposed at the twelve o'clock position with respect to the generally circular body of the mouthpiece, with the reed disposed at the six o'clock position. A pair of sound adjustment members 114*a,* 114*b* is provided, having a plurality of channels 116 sized to securely receive the cord 106 so as to locally prevent or attenuate vibration of the cords. The sound adjustment members 114*a,* 114*b* can be adjusted, for example, as disclosed in U.S. Pat. No. 9,183,817, hereby incorporated by reference in its entirety, to provide the desired vibration absorbing region to, in turn, provide a darker or brighter sound, as desired by the musician. Each sound adjustment member 114*a*, 114*b* may be composed of, for example, one piece or two or more pieces coupled together.

A distinction of ligature 104 is the bridge 116, which allows it to provide improvements over ligatures of the prior art. With reference to FIG. 5A, the bridge includes an upper plate 128, which surrounds the centrally located through hole 122. A pair of legs 130*a,* 130*b* extend from the upper plate 128, having a width, w, in the longitudinal direction 1034 of the mouthpiece when attached thereto. Unlike with bridge 1016, however, the legs 130*a,* 130*b* in this exemplary embodiment do not extend, at a constant width, to engage the mouthpiece. Instead, bridge 116 includes a mouthpiece skate 140, having an increased width, W, along the longitudinal direction 1034 of the mouthpiece.

In certain embodiments, the ratio W:w (i.e., the increased width of the mouthpiece skate along the longitudinal direction 1034 of the mouthpiece to the width of the arm) along the longitudinal direction 1034 of the mouthpiece can range from about 1.05 to about 8, about 1.2 to about 6, about 1.5 to about 5, or from about 1.7 to about 2.6 (e.g. about 2.3). For example, W can be, in certain exemplary embodiments, from about 4 mm to about 10 mm, about 6 mm to about 8 mm (e.g., 7 mm); and/or w can be from about 1.5 mm to about 5 mm, or from about 2 mm to about 4 mm (e.g., 3 mm).

Figure 5B:
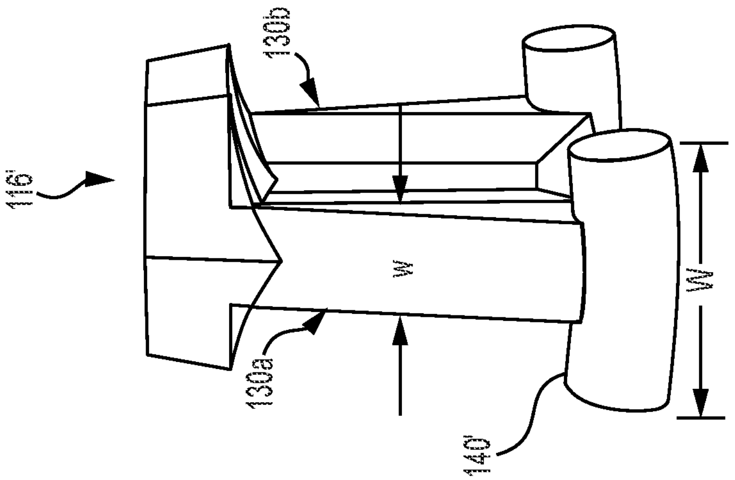
Figure 5C:
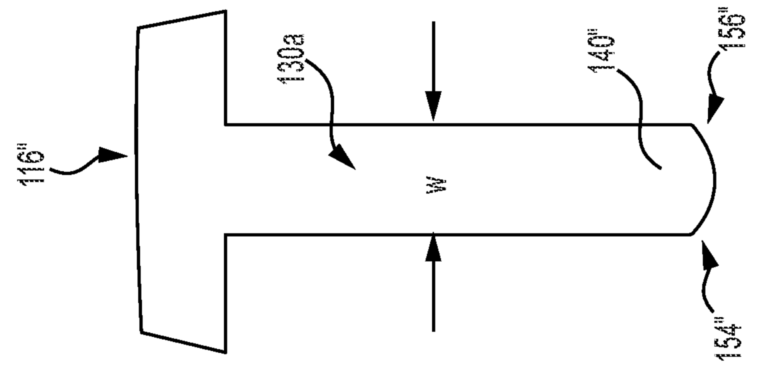
Figure 5D:
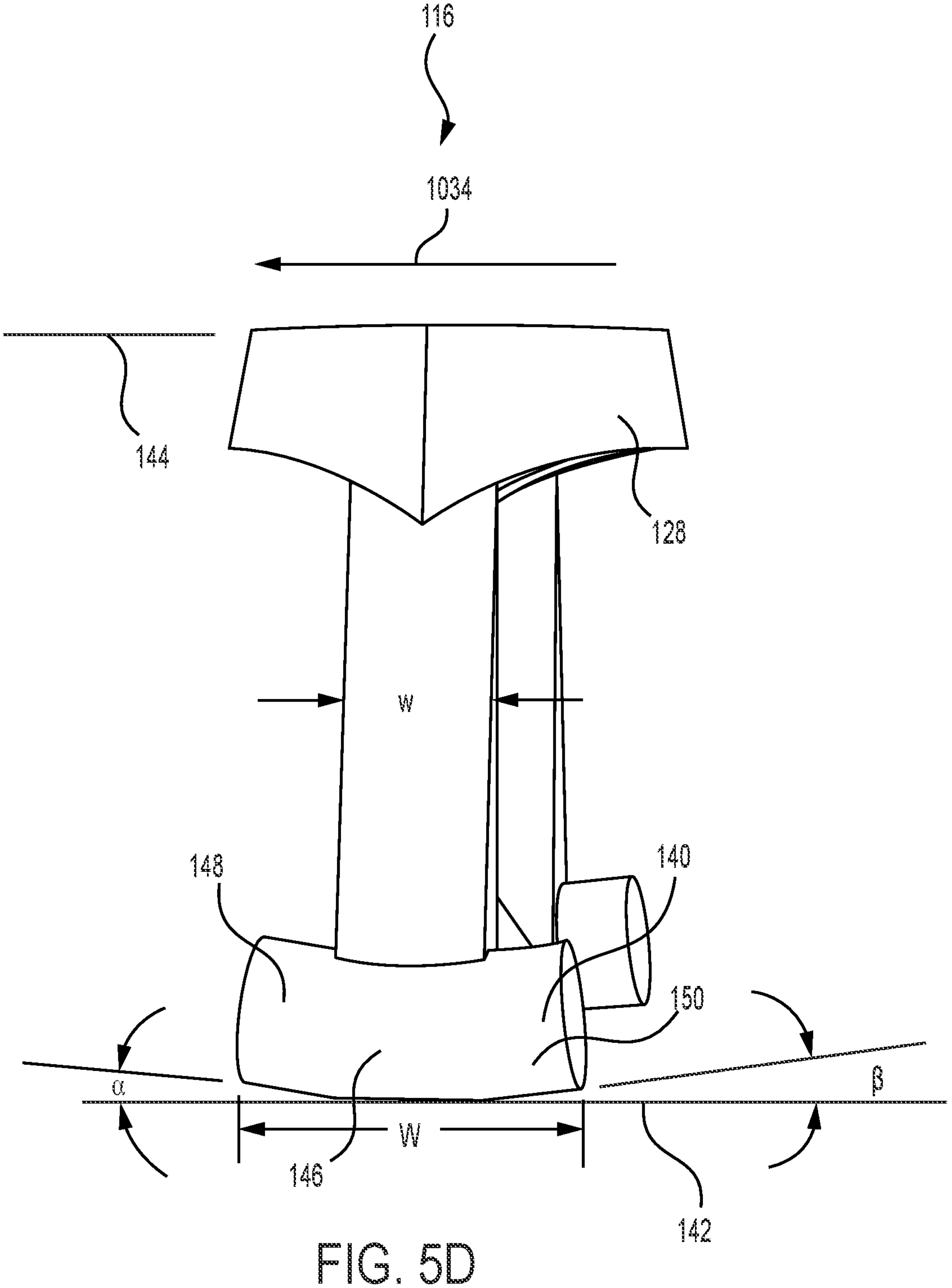

With reference to FIG. 5D, the mouthpiece skate 140 includes a plurality of (e.g., three) segments. A first central segment 146 defines a plane 142 about its lowermost surface, generally parallel to a plane 144 defined by the top end of the upper plate 128. A first outer segment 148 extends from the first central segment upward at an angle, α, from the plane 142 defined by the first central segment 146. A second outer segment 150 extends from the first central segment upward at an angle, β, from the plane 142 defined by the first central segment 146. This configuration with a plurality of segments provides an angled pipe for tight contact with the mouthpiece. Overall, the skate is of a generally circular longitudinal cross section and curved, e.g., the skate extends in a generally upward direction.

Angles α and β can be the same or different. Further, in certain embodiments, the mouthpiece skate can extend at an angle at only one end. α and β can range from about 0.5 degrees to about 20 degrees, or from about 1 degree to about 15 degrees, or from about 5 degrees to about 10 degrees (e.g., about 7.5 degrees).

Figure 5E:
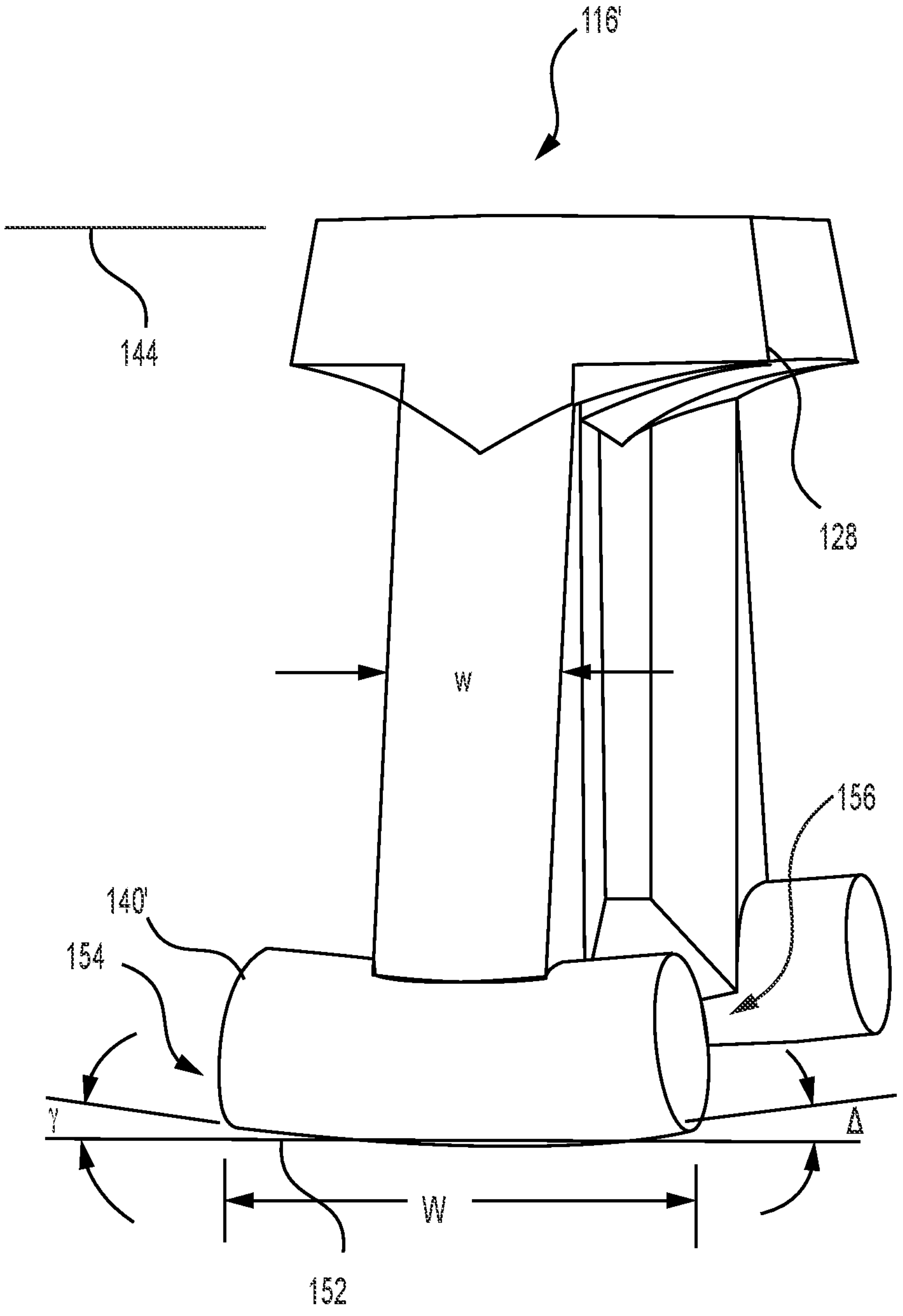

In another exemplary embodiment, shown in FIGS. 5B and 5E, a bridge 116' is provided. Bridge 116' is similar to bridge 116, and likewise includes a mouthpiece skate 140', having an increased width, W, along the longitudinal direction 1034 of the mouthpiece, as compared to the width, w, of the legs 130*a*, 130*b*. In this exemplary embodiment, mouthpiece skate 140' has a smooth tubular or rocker configuration, as opposed to being composed of a plurality of segments, which in turn provides smooth angle adjustment, as will be discussed in greater detail below. In certain embodiments the smooth tubular or rocker configuration is similar in shape to the shape of rockers on the bottom of a rocking chair. For example, the skate 140' is of a generally circular longitudinal cross-section.

With reference to FIG. 5E, a lowermost surface of the midpoint of the mouthpiece skate 140' defines a point tangent to a plane 152 generally parallel to a plane 144 defined by the top end of the upper plate 128. A first end 154 of the mouthpiece skate 140' extends upward at an angle, $\gamma$, from the plane 152 defined by the midpoint of the mouthpiece skate 140'. A second end 156 extends upward at an angle, $\Delta$, from the plane 152 defined by the midpoint of the mouthpiece skate 140'. Angles $\gamma$ and $\Delta$ can be provided as $\alpha$ and $\beta$, described above.

Figure 5F:
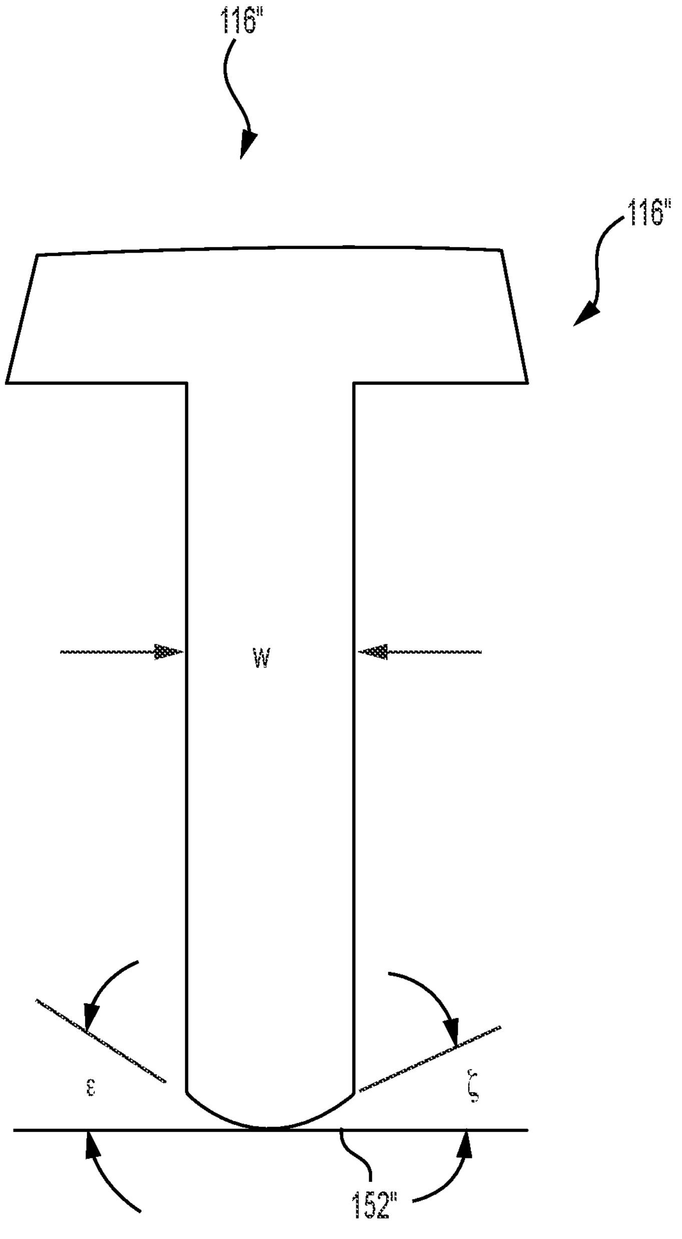

In another exemplary embodiment, shown in FIGS. 5C and 5F, bridge 116" is provided. Bridge 116" provides arms and a skate 140" of constant width, w. The mouthpiece skate 140" is defined by a rounded pole, and has a first end 154" that extends upward at an angle, $\varepsilon$, from a plane 152" defined by a lowermost point of the midpoint of the mouthpiece skate 140" and a second end 156" that extends upward at an angle $\zeta$, from a plane 152" defined by the midpoint of the mouthpiece skate. Angles $\varepsilon$ and $\zeta$ can be provided as $\alpha$ and $\beta$, described above, or alternatively one or more of the ends can extend at angles from about 1 or 5 degrees to about 50 or 75 degrees, such as from about 7.5 degrees to about 45 degrees. This particular embodiment provides the advantage of easier manufacturing.

Figure 6C:
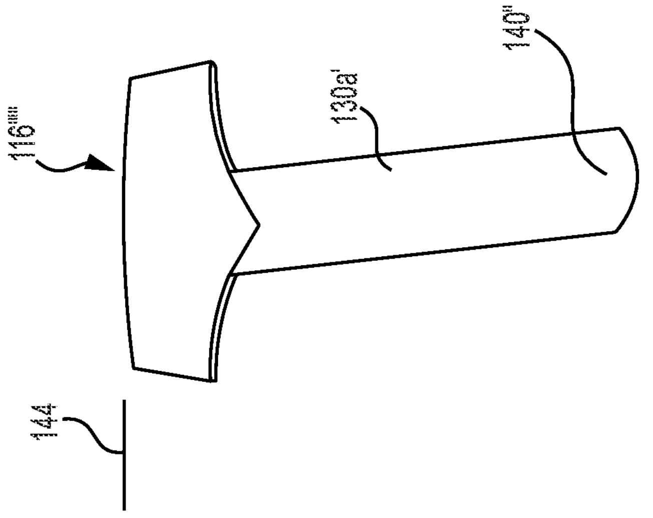
FIGS. 6A, 6B, 6C are various views of exemplary bridges of the ligature of the subject disclosure.
Figure 6B:
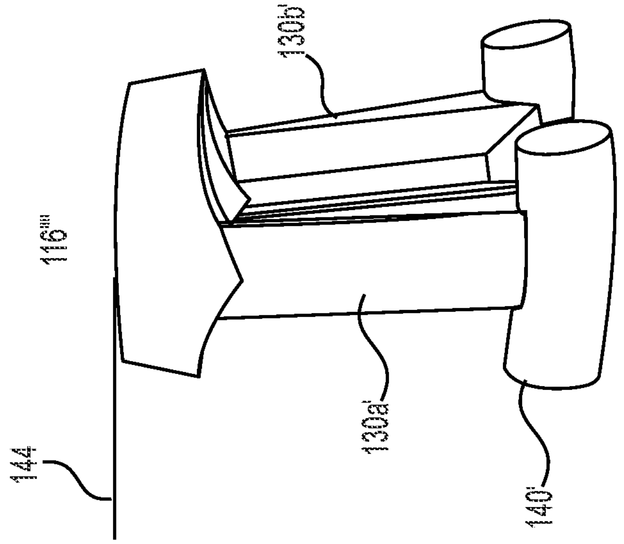
Figure 6A:
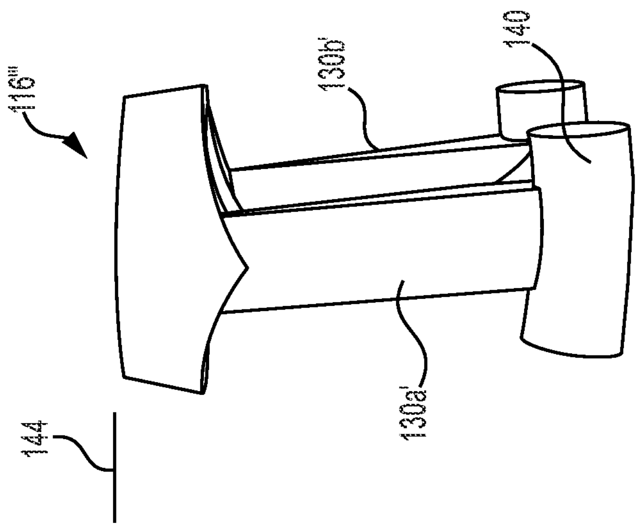
Figure 7:
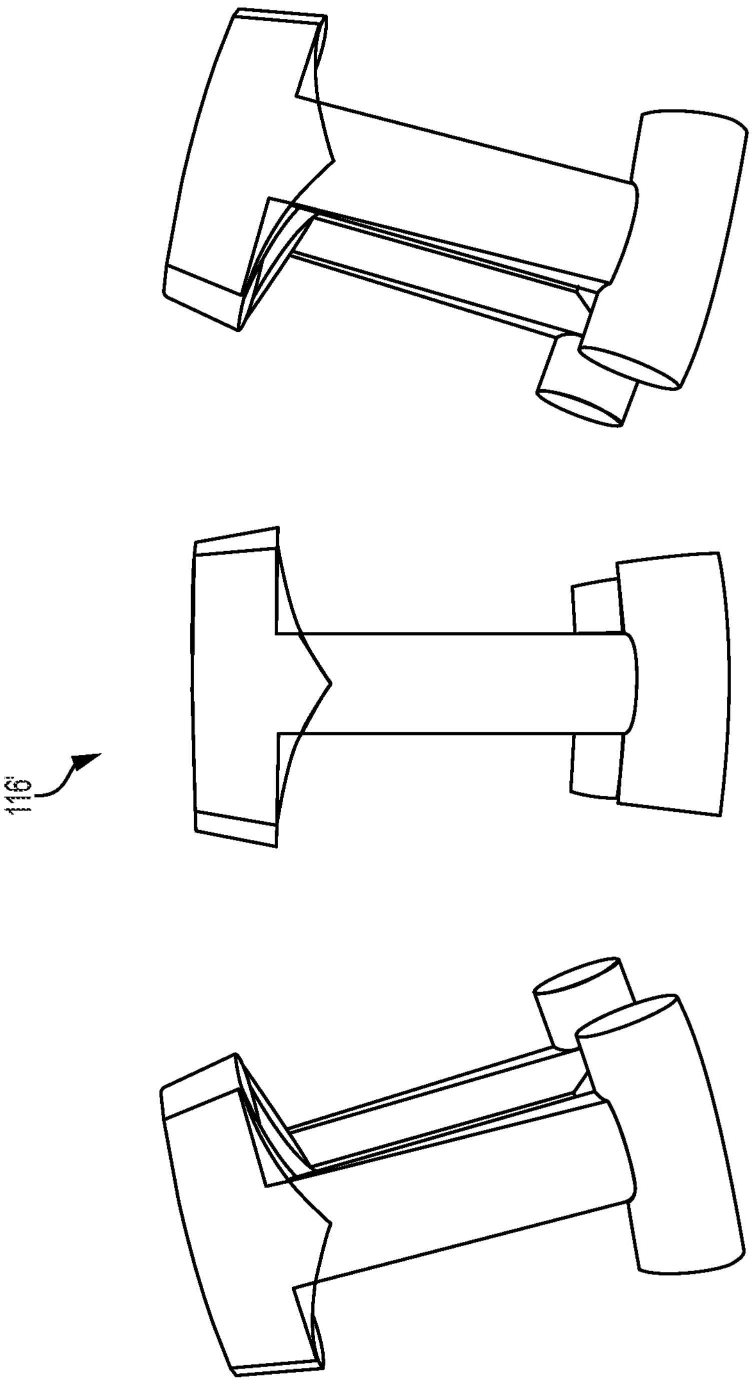
FIG. 7 depicts perspective views of exemplary bridges of the ligature of the subject disclosure.
Figure 8:
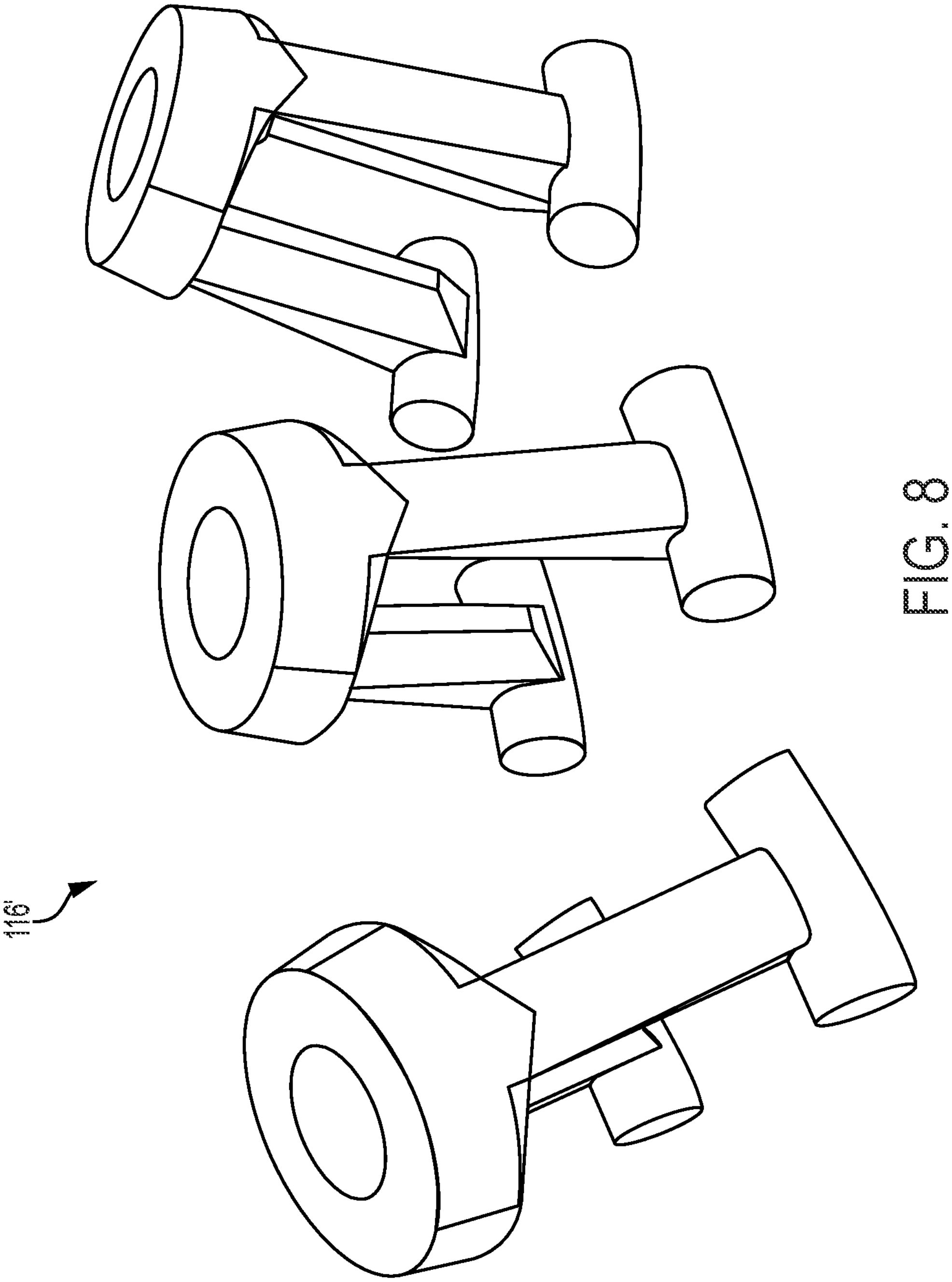
FIG. 8 depicts perspective views of exemplary bridges of the ligature of the subject disclosure.

In other exemplary embodiments, shown in FIGS. 6A-6C, the bridges includes an arm 130' that extends at a non-perpendicular angle (i.e., at a slant or obliquely) from the plane 144 defined by the top end of the upper plate 128. Bridge 116'", 116"", and 116'"" respectively include mouthpiece skates 140, 140' and 140", as with bridges 116, 116' and 116". These particular embodiments assist with an easy angle change. The tilted angle makes an inclining movement easier since the tightening force will move more efficiently with the vector angle than a straight vertical angle.

By virtue of the angled design of the mouthpiece skate, the presently disclosed ligatures can accommodate mouthpieces of different surface angles while maintaining a snug and secure connection with the mouthpiece. Upon tightening the wingnut, the bridge, and thus also the puller and ligature itself, changes angles depending on the mouthpiece surface angle of the mouthpiece to which the ligature is applied.

Figure 9A:
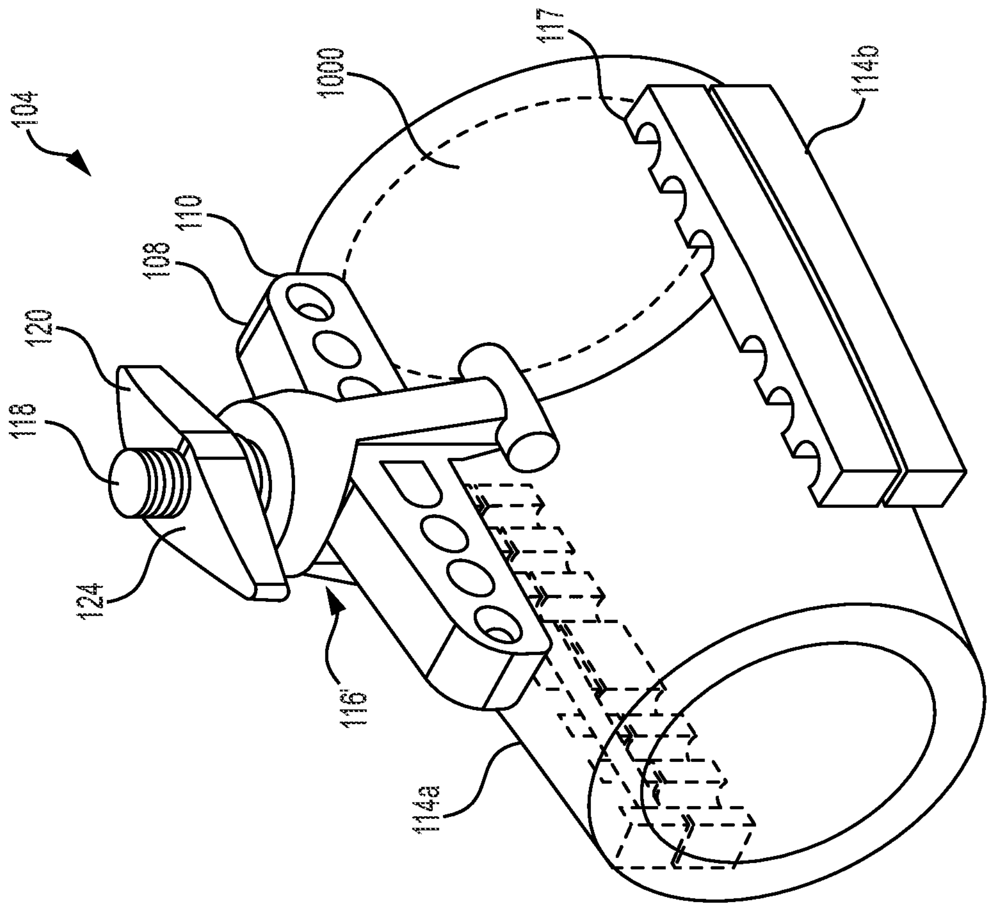
FIG. 9A is a perspective view of a ligature of subject disclosure with the cord omitted for purposes of clarity.

Another view of the ligature 104 with bridge 116' positioned on a mouthpiece 1000, shown without the cord for purposes of clarity, is set forth in FIG. 9A. The bridge 116' straddles the puller 108. The pair of sound adjustment members 114*a*, 114*b* is provided, having a plurality of channels 117 sized to securely receive the cord so as to locally prevent or attenuate vibration of the cords. As shown, in this exemplary embodiment, each sound adjustment member 114*a*, 114*b* is composed of two pieces coupled together. Disposed as in FIG. 9A in the three and nine o'clock positions, the sound adjustment members 114*a*, 114*b* can be adjusted as desired by the musician.

Figure 9B:
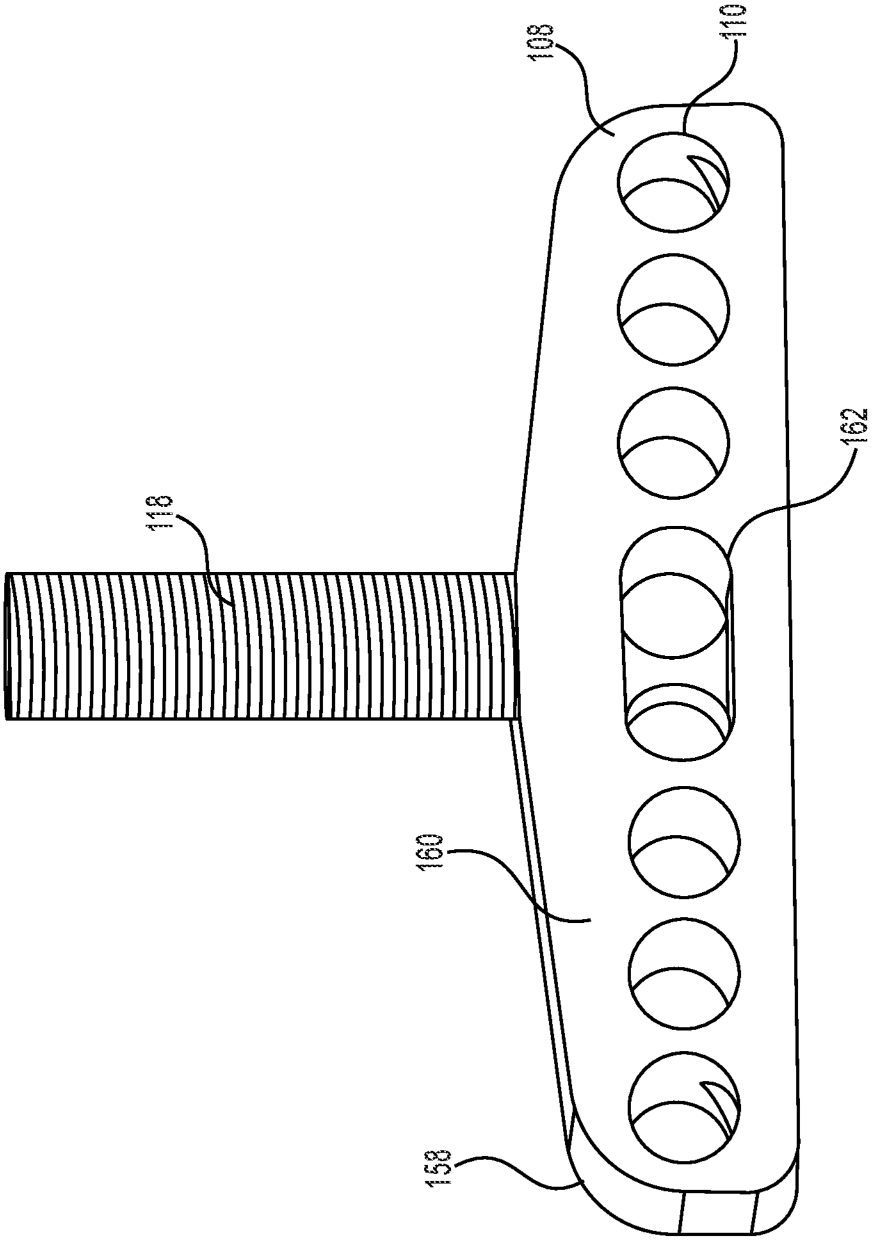
FIG. 9B is a perspective view of the puller of the ligature of FIG. 9A.

The bridge 116' straddles the puller 108. As shown in FIG. 9B, the puller 108 in this exemplary embodiment has a first planar side 158 that includes eight equally spaced through holes 110 and a second planar side 150, opposite the first planar side, that includes six outer through holes and an elongated inner through hole 162. The cord (not shown) is intended to be threaded through the outer six through holes, with the bridge 116' occupying the space of the inner two through holes along planar side 158 and the elongated through hole 162 of planar side 160. The guide bar 118 extends proud of the puller. The wingnut 120 includes a centrally located orifice 124 that is provided with threads complementary to the guide bar 118. The wingnut 120 engages the bridge 116 to secure the puller 108 to the mouthpiece.

Figure 9C:
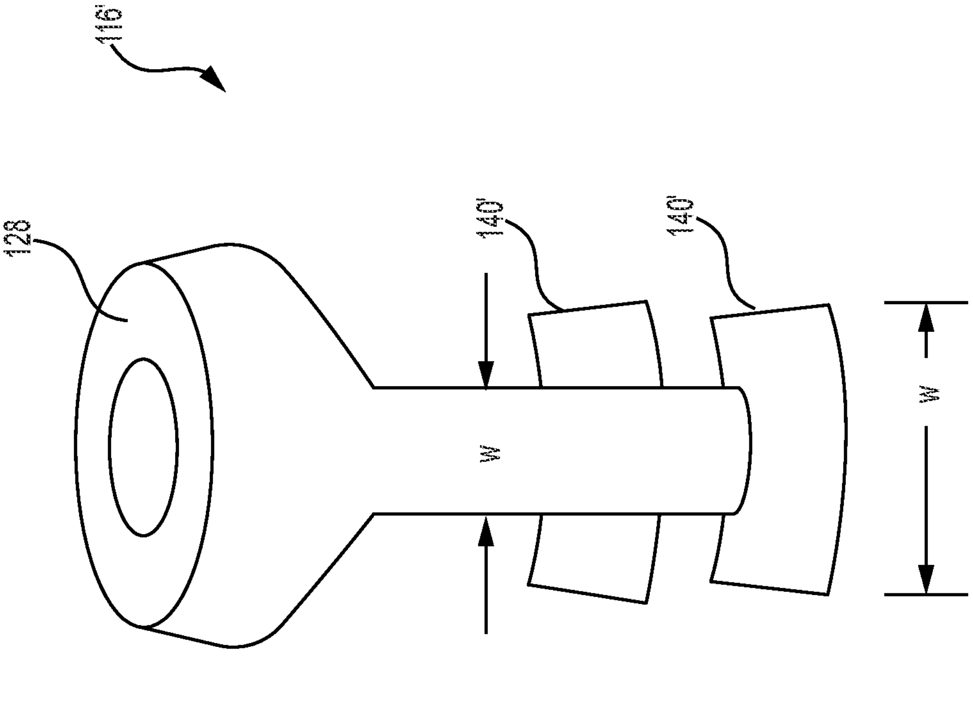
FIGS. 9C and 9D are perspective views the bridge of the ligature of FIG. 9A.
Figure 9D:
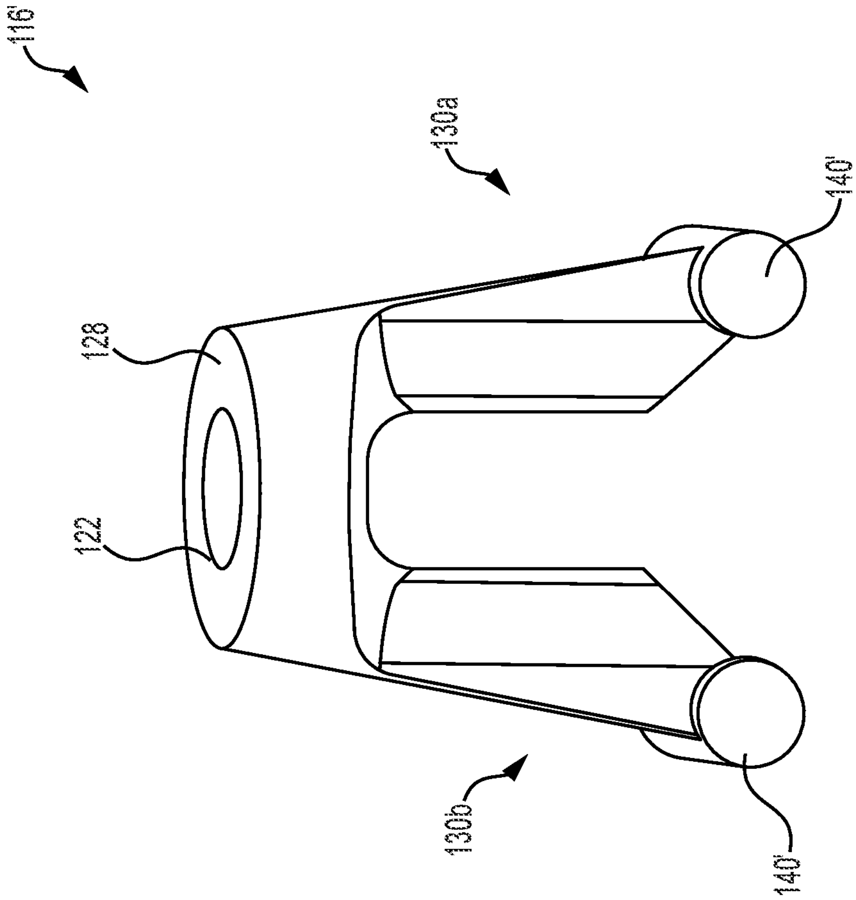

The bridge 116' is shown in FIGS. 9C-9D. The bridge 116' includes an upper plate 128, which surrounds the centrally located through hole 122. A pair of legs 130*a*, 103*b* extend from the upper plate 128, having a width, w, in the longitudinal direction of the mouthpiece, and each terminating with a tubular skate 140' having a width, W. Again, unlike with bride 1016, the legs 130*a*, 130*b* in this exemplary embodiment do not extend, at a constant width, to engage the mouthpiece. Instead, bridge 116 includes a mouthpiece skate 140, having an increased width, W, along the longitudinal direction 1034 of the mouthpiece. The dimensions W and w can be provided as set forth above.

Figure 10:
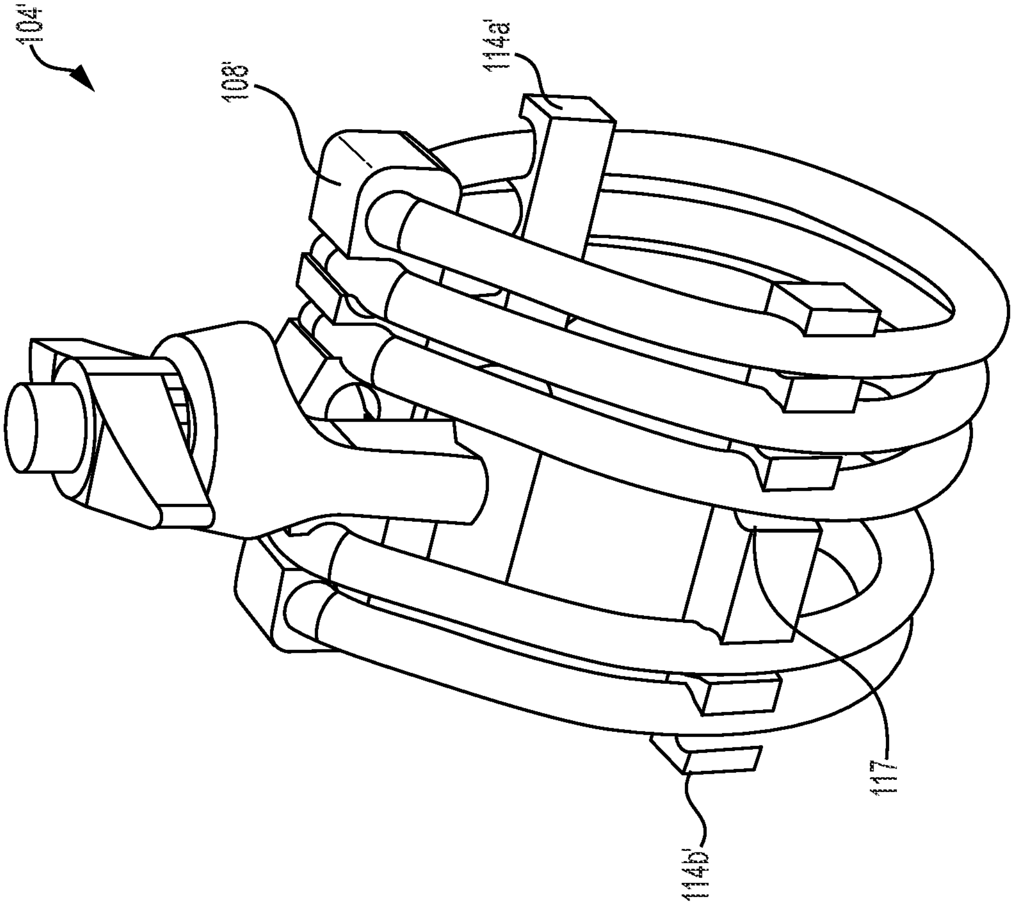
FIG. 10 is a perspective view of a ligature of the subject disclosure according to another exemplary embodiment.
Figure 11:
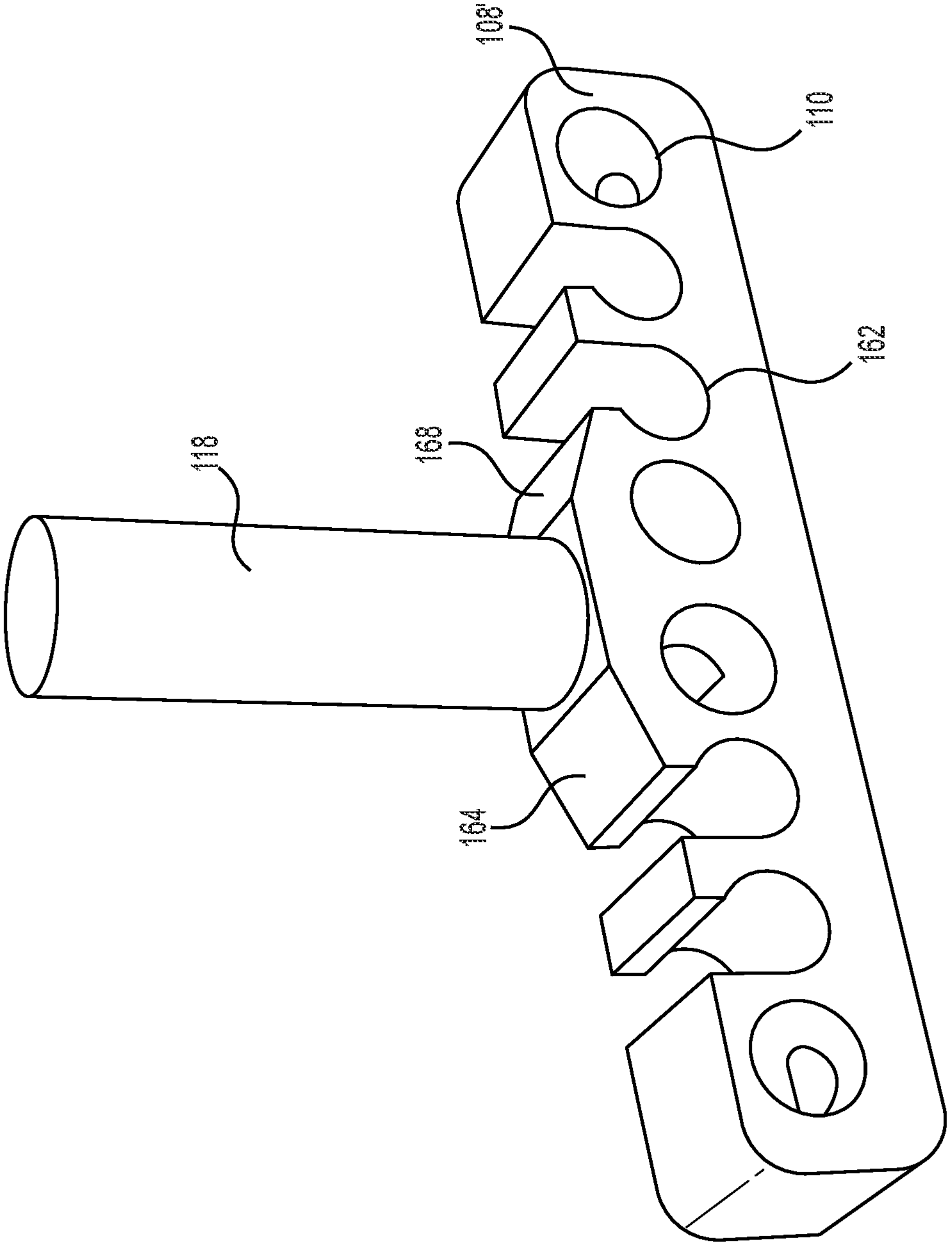
FIG. 11 is a perspective view of the puller of the ligature of FIG. 10.
Figure 12:
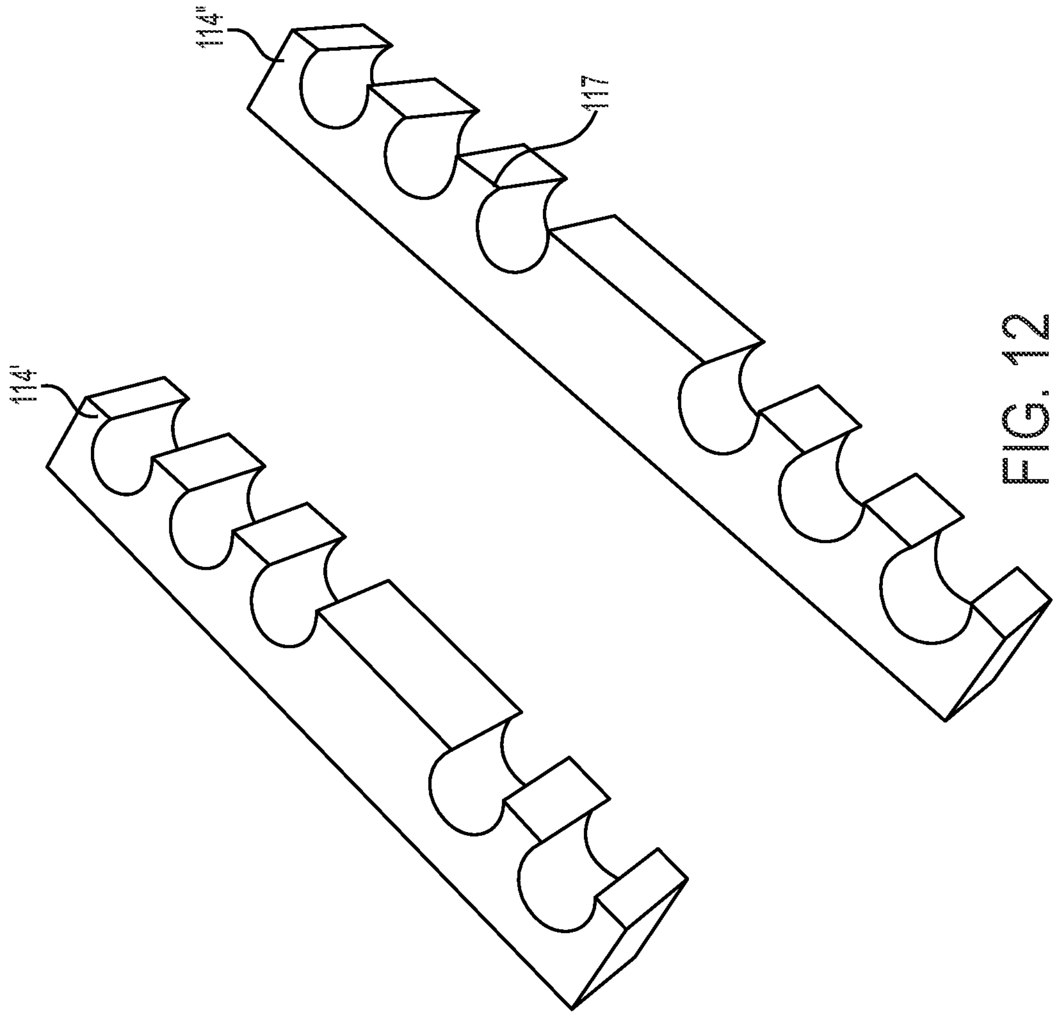
FIG. 12 are perspective views of sound adjustment members for use with the ligature of FIG. 10.

A ligature 104' according to another exemplary embodiment is shown in FIGS. 10-12. This ligature is similar to ligature 104, discussed above, but includes a puller 108' and sound adjustment members 114*a*' and 114*b*'.

The puller 108' is shown in FIG. 11 and one or more of the through holes 110 is provided with an opening 163 along its upper end, as shown with through hole 162. Furthermore, the top surface of the puller 108' can include top planar surfaces provided at an angle to guide the cord to the through hole, such as planar surfaces 164 and 166. This particular exemplary configuration allows for easier threading of the cord.

The modified sound adjustment member 114' and 114" is shown in FIG. 12. Sound adjustment members 114' are similar to sound adjustment members 114, except that the channels 117 receiving cord 106 face outwardly instead of inwardly when assembled to the mouthpiece. While sound adjustment member 114' contains 5 channels, other numbers of channels can instead be provided, such as, for example, sound adjustment member 114", which contains six channels to receive the cord and attenuate vibration.

Figure 13B:
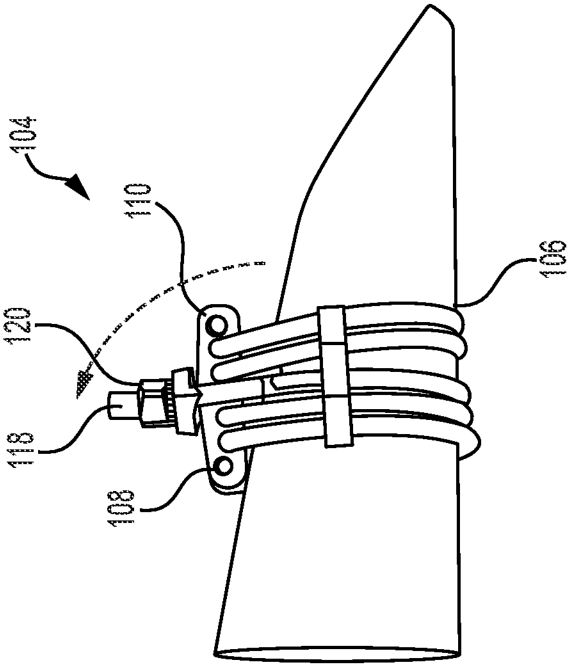
FIGS. 13A and 13B are side views of the ligature of the prior art and a ligature of the present disclosure.
Figure 13A:
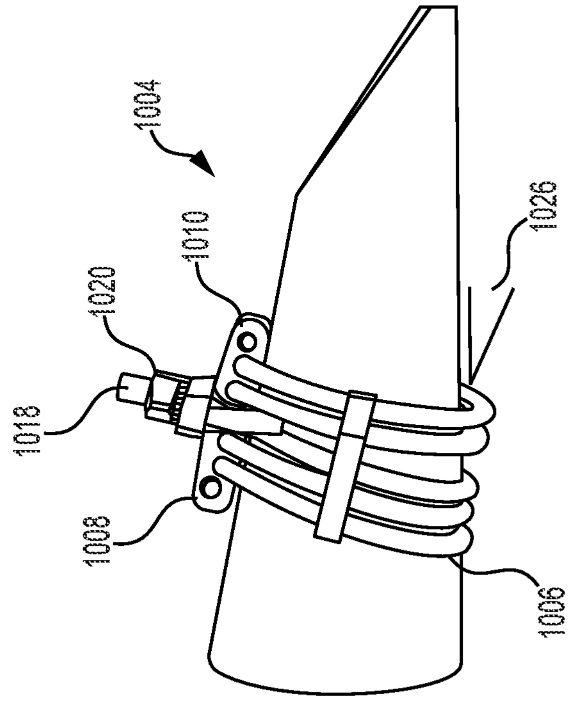
FIG. 13A PRIOR ART

For example, as shown in FIG. 13A, a ligature 1004 of the prior art will not change its orientation when introduced, for example, to a mouthpiece with a steeper slope, as compared to a standard mouthpiece slope for which the ligature 1004 is designed to be applied. The puller 1008 is aligned parallel to the slope of the mouthpiece defined by its upper surface, and the guide bar 1018 is oriented perpendicular to the slope of the mouthpiece, and a gap 1026 results thereby forming a less than optimal fit.

In contrast, as shown in FIG. 13B, for a ligature of the present disclosure, upon being introduced to a mouthpiece with a significant slope, the bridge, by virtue of the ends of the of the mouthpiece skate being angled, will "rock" or pivot upon tightening the wingnut to automatically adjust the angle of the ligature to prevent gaps and provide a tighter and more confirming fit.

Figure 14:
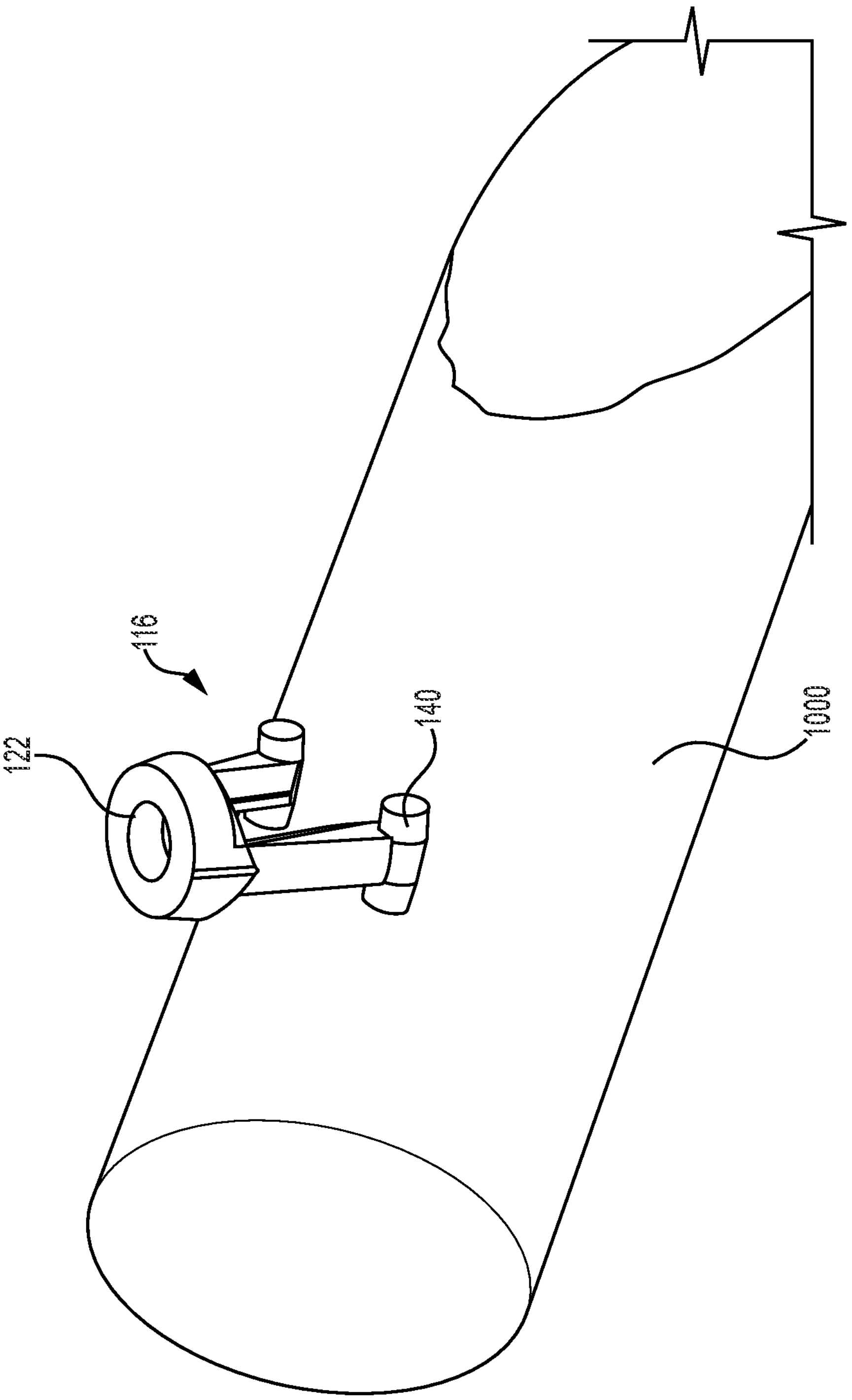
FIG. 14 is a schematic view demonstrating the ligature of the subject disclosure and its ability to avoid slippage.

As shown in FIG. 14, the ligature and bridge 116 of the present disclosure, via the expanded contact surface area provided by mouthpiece skate 140 in certain embodiments, reduces the possibility of the ligature slipping. For example, as shown in FIG. 11, the bridge 116 is less likely to slip from the desired 12 o'clock position (or any desired initial position) to an undesired location (such as in the direction of 11 o'clock or 1 o'clock). Additionally, ligatures provided by the present exemplary embodiments of the present disclosure will also alleviate sharp edges that can scratch or cosmetically damage the instrument.

While the subject disclosure has been described with reference to exemplary embodiments, it will be appreciated by those skilled in the art that various changes may be made and equivalents may be substituted for elements thereof without departing from the scope of the subject disclosure. In addition, modifications may be made to adapt a particular situation or material to the teachings of the subject disclosure without departing from the essential scope thereof. It is to be understood, therefore, that the subject disclosure is not limited to the particular aspects disclosed, but it is intended to cover modifications within the spirit and scope of the subject disclosure as defined by the appended claims and discussed above.

The invention claimed is:

1. A ligature for a mouthpiece of a musical instrument comprising:

a puller that includes a plurality of through holes;

a cord for passing through the plurality of through holes; and a bridge configured to straddle the puller and engage the mouthpiece, the bridge comprising a plate, an arm extending from the plate, and a curved mouthpiece skate extending from the arm; and a fastener for securing the puller and the bridge.

2. The ligature of claim 1, wherein at least one end of the curved mouthpiece skate extends at an angle with respect to a horizontal plane defined by a lowermost surface of the curved mouthpiece skate of from about 5 degrees to about 10 degrees.

3. The ligature of claim 1, wherein the curved mouthpiece skate has a larger width than a width of the arm.

4. The ligature of claim 3, wherein the ratio of the width of the curved mouthpiece skate: the width of the arm is from about 1.7 to about 2.6.

5. The ligature of claim 1, wherein the curved mouthpiece skate includes a central segment and an outer segment extending at angle with respect to the center segment.

6. The ligature of claim 1, wherein the curved mouthpiece skate includes a substantially circular longitudinal cross-section.

7. The ligature of claim 1, wherein the cord comprises Kevlar®.

8. The ligature of claim 1, wherein the fastener is a wingnut.

9. A bridge for a ligature comprising:

an upper plate including a through hole;

a pair of arms extending from opposite ends of the upper plate; and curved mouthpiece skates extending from each of the arms, the curved mouthpiece skates respectively having at least one end extending at an angle relative to a horizontal plane defined by a lowermost surface of the curved mouthpiece skates.

* * * * *